E. L. CASE.
Stove-Pipe Joint.
No. 217,059.  Patented July 1, 1879.
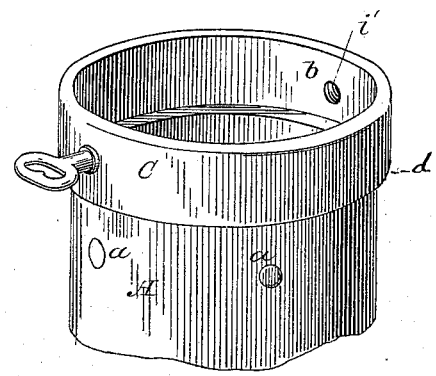
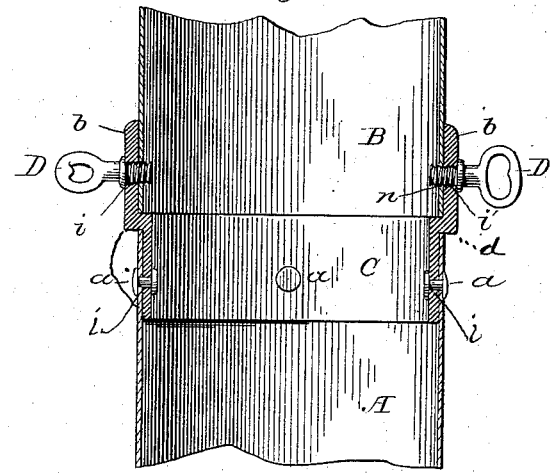
Attest:
Clarence Poole
R. K. Evans
Inventor:
Edwin L. Case
by A. H. Evans & Co.
attys

UNITED STATES PATENT OFFICE.

EDWIN L. CASE, OF DENVER, COLORADO.

IMPROVEMENT IN STOVE-PIPE JOINTS.

Specification forming part of Letters Patent No. 217,059, dated July 1, 1879; application filed April 16, 1879.

*To all whom it may concern:*

Be it known that I, EDWIN LUMAN CASE, of Denver, in the State of Colorado, have invented a new and useful Improvement in Stove-Pipe Joints; and I hereby declare the following to be a full, clear, and exact description thereof, reference being had to the accompanying drawings, making a part of this specification, in which—

Figure 1 is a perspective view of the coupling. Fig. 2 is a vertical sectional view.

The object of my invention is to provide a joint for stove-pipes which can be readily and rapidly put together, and then secured so it cannot be parted by accident; and my invention consists in riveting to one end of the pipe a flanged cast ring provided with an enlarged end for the reception of the end of the other joint of pipe. This flanged ring is provided with set-screws to secure the pipe by means of proper holes.

In order that those skilled in the art may make and use my invention, I will proceed to describe the manner in which I have carried it out.

In the said drawings, A B represent the lengths of pipe to be joined, and C is a cast-metal flanged ring to be fastened to pipe A by means of rivets $a$ passing through proper holes. The projecting rim $b$ is made of a proper size to snugly fit over the end of pipe B, and its end rests against the shoulder $d$. Two screw holes, $i$ $i'$, pass through the rim $b$, and are provided with set-screws D D to pass into holes $n$ $n$ in pipe B.

By passing the end of pipe B into the casting, and then securing it by means of set-screws, I make a durable joint, and yet, at the same time, one easily taken apart.

Having thus described my invention, what I claim as new, and desire to secure by Letters Patent, is—

The stove-pipe A, provided with holes for the reception of rivets $a$ $a$, and flanged casting C, provided with the shoulder $d$ and screw-holes $i$ $i'$, in combination with stove-pipe B, provided with holes $n$ $n$, and the set-screws D D, all constructed to operate as and for the purpose set forth.

EDWIN LUMAN CASE.

Witnesses:
PETER WINNE,
R. H. McMANN.